United States Patent [19]

Engel et al.

[11] Patent Number: 4,856,826
[45] Date of Patent: Aug. 15, 1989

[54] AIR TRANSFER SYSTEM

[75] Inventors: Donald F. Engel, Prior Lake; Steven S. Gieseke, Richfield, both of Minn.

[73] Assignee: Donaldson Company, Inc., Minneapolis, Minn.

[21] Appl. No.: 186,585

[22] Filed: Apr. 27, 1988

[51] Int. Cl.⁴ ............................................. F16L 43/00
[52] U.S. Cl. .................... 285/181; 285/253; 285/903; 285/259
[58] Field of Search ................ 285/253, 181, 903, 259

[56] References Cited

U.S. PATENT DOCUMENTS

| | | | |
|---|---|---|---|
| 981,705 | 1/1911 | Spencer | 285/181 |
| 1,808,066 | 6/1931 | Plummer | 285/181 X |
| 3,684,317 | 8/1972 | Kazienko et al. | |
| 3,891,224 | 6/1975 | Ditcher | |
| 3,998,478 | 12/1976 | Zopfi | |
| 4,133,563 | 1/1979 | Yamazaki | |
| 4,379,559 | 4/1983 | Bohman | |
| 4,453,746 | 6/1984 | Keenan | 285/253 X |
| 4,542,922 | 9/1985 | Grossaver | 285/903 X |
| 4,723,796 | 2/1988 | Nattel | 285/903 X |
| 4,763,932 | 8/1988 | Matz et al. | 285/253 X |

Primary Examiner—Joseph Falk
Attorney, Agent, or Firm—Merchant, Gould, Smith, Edell, Welter & Schmidt

[57] ABSTRACT

An air flow conduit system is presented for air flow communication between an air filter mechanism and an engine intake manifold. The conduit system comprises first, second and third substantially rigid conduit members. Engagement between conduit members is provided by means of a rib system on a narrow end of a conduit member being received within a broad end of a next adjacent conduit member. Sealing engagement occurs by means of an elastomeric seal member positioned between the ribs and an end of a conduit member within which the ribs are received. A preferred rib arrangement is provided, to insure a flexible, multi-point, seal system.

20 Claims, 4 Drawing Sheets

AIR TRANSFER SYSTEM

FIELD OF THE INVENTION

The present invention relates to air transfer systems, i.e. conduits for the passage of air. In particular, the invention concerns systems for the passage of air between an air filter arrangement and an intake manifold system or turbo of an internal combustion engine. More specifically, air transfer systems according to the present invention concern vehicles such as trucks, construction and industrial equipment, buses, agricultural equipment or the like. Such systems may also be utilized in non-movable equipment such as compressors and generators.

BACKGROUND OF THE INVENTION

Generally, internal combustion engines require air or oxygen for operation. Typically, the air is directed into the engine, wherein it is mixed with fuel to provide for efficient combustion. Generally, the air is first filtered through an air filter arrangement, to remove dirt, dust and the like therefrom.

In many engine systems, the engine and filter are mounted somewhat independently of one another. For motorized vehicles, typically the air filter is mounted upon an exterior frame, or interior body portion, and the engine is received within an inner compartment. Generally, these portions of the vehicle can move somewhat independently of one another, for example due to mounting differently with respect to the vehicle suspension system, and thus a flexible conduit system between the filter and engine is preferred, and under many circumstances is required.

Even for stationary engines, some flexibility may be preferred since, especially under substantial loads, engine vibration or movement may occur.

There have been numerous problems in conventional systems in providing for efficient, effective conduit systems for air flow communication between the filter mechanism and the engine. Many of these problems generally relate to, or concern, the following:

1. First, there has been no standardization in the positioning of the air filter mechanism relative to the engine air inlet. Thus, the provision of a standard component arrangement, prior to the present invention, has posed a problem. Even within a single model or make of vehicle, generator, etc., uniformity has not been achieved, since relative filter position and engine position may vary somewhat. Thus, in many instances custom conduit systems have been necessary.

2. Conventional systems (non-custom) have generally involved a combination of sections of relatively rigid tubular members, with sections of flexible hosing, elbows and connectors in order to accommodate the tortuous path between the air filter and the engine. Such multicomponent systems have been difficult to assemble, especially in tight quarters. A mechanic working alone may find that it is difficult to handle all of the pieces at once and keep same in an appropriate position prior to a tightening of the various clamps, etc. needed to obtain assembly. Thus, the multi-component systems are not only inconvenient, but they may require more than one mechanic for installation. A problem with need for more than one mechanic is not only that it is inconvenient and expensive, but also it may be difficult for more than one mechanic or operator to become positioned appropriately with respect to the vehicle engine, i.e., in the relatively tight quarters.

3. As various components of conventional multicomponent systems are tightened into position, stress or strain on various joints may be created and can pose a substantial problem. This can lead to premature failure of components or joints between them. In some instances, a complete such failure can generate substantial engine damage, by exposure to unfiltered air.

4. Generally, air flow from unobstructed portions of conduits past obstructions causes undesired turbulence. For example, as air flows past a joint from a wider conduit to an internally received narrower conduit it must pass over the obstruction presented by the end of the narrower conduit. Turbulence generated at such a joint results in an increase in pressure, and energy is required to overcome the turbulence. This can create a less efficient air flow system. Generally, as will be understood from the following detailed descriptions, conventional systems have been particularly inefficient with respect to this form of turbulence.

5. Some bends in conventional systems have involved rubber hosing or the like. Such hosing is particularly undesirable, as it may be subject to failure under extreme loads and over wide temperature variations and/or pressure fluxes. Further, substantial stresses applied during assembly may cause premature failure.

6. Conventional systems generally involve, due to the presence of a plurality of elements, a great many critical joints. A critical joint is a connection between conduit members. Any critical joint, in any system, is a risk point, that is, a point of potential failure and leakage. It is desired to maintain a limited number of such points. Conventional arrangements generally involve considerably more critical joints than are necessary with systems according to the present invention.

The above types of problems, and other problems of features related to conventional arrangements, will be understood by reference to the drawings, FIGS. 7 and 8, wherein a conventional system is represented. Referring to FIG. 7, reference numeral 1 generally designates a conventional conduit system providing for communication between an air filter assembly 3 and an engine air intake manifold 4. The term "air intake manifold" as used herein is meant to refer to an air intake for any unit or mechanism including an engine, a turbo, etc. The positioning of the filter assembly 3 relative to the intake manifold 4 is intended to be representational only, and systems may vary. No specific engine system is represented. That is, filter assembly 3 and intake manifold 4 may form a portion of any of a variety of systems, including diesel trucks, construction equipment, agricultural equipment, generator systems, compressor systems, or the like. What is generally common to all such systems is that system 1 is needed to provide an air flow conduit between filter assembly 3 and intake manifold 4.

Typically, the air filter assembly 3 has an exit port 7 thereon, through which air is directed into conduit system 1. Similarly, manifold 4 has a corresponding inlet port 8.

Very often, the exit port 7 and inlet port 8 are oriented skewed with respect to one another, and in different planes. This is suggested by FIG. 7. As a result, generally at least three different bends in the conduit system 1 are necessary in order to provide air flow communication between the exit port 7 and the inlet port 8. This is indicated in FIG. 7 at bends 10, 11 and 12.

For conventional systems, flexible elbow sections are utilized at the bends, such as bends 10, 11 and 12. For the arrangement shown in FIG. 7, this is indicated at hose sections 15, 16 and 17, respectively. Hose section 15 engages exit port 7 at end 20. End 21, remote from end 20, provides for an exit of air flow outwardly from section 15. For the conventional arrangement shown, end 20 engages inlet 7 in a conventional manner. That is, inlet 7 includes a conventional outwardly projecting bead thereon, not shown, over which end 20 is forced. Retention is made in a conventional manner, by means of a clamp positioned to prevent the hose member 20 from being pulled off or over the bead. Such clamping systems are well known, and one is described with respect to FIG. 8, discussed below.

Referring to FIG. 7, communication between section 15 and section 16 is provided by means of elongate tube 24. Generally, elongate tube 24 is relatively rigid in construction and provides for passage of air in a preferred direction. The joint 25 between hose section 15 and tube 24 is detailed in FIG. 8, in cross-section.

Referring to FIG. 8, elongate tube 24 is shown having a circumferential bead 30 thereon. Flexible hose 15 is sufficiently flexible so that end 21 can be forced over the bead 30. A conventional hose clamp 31 or the like, positioned around a portion 32 of hose 15 pushed over bead 30, provides for a relatively secure engagement. This clamp and bead engagement is typical of all critical joints in conventional arrangements, and is at all joints in the arrangement depicted by FIG. 6. That is, critical joints 35, 36, 37, 38 and 39, as well as critical joint 25.

From a review of FIGS. 7 and 8, many of the problems previously discussed with respect to prior arrangements will be readily understood.

For example, it is readily understood that a plurality of parts are necessary, in order to accommodate the tortuous path. For each part, a clamping arrangement is necessary. It may be difficult for a mechanic to position all parts appropriately, and maintain them in position, during the tightening process.

Further, very little adjustment is allowed in the components, to accommodate universality. That is, little length or angle adjustment is permitted at the various joints; however, it will be understood that some rotational adjustment is available, for example at critical joints 35, 25, 36, 37, 38 and 39.

As various components are tightened into position, it will be understood that stress may be placed at some of the critical joints along the system. That is, each critical joint generally requires a co-axial alignment of connecting tube portions. Should a non-perfect alignment, i.e., non-co-linear or co-axial alignment, occur, substantial stress on one or more of the critical joints may take place.

Referring to FIG. 8, it will be understood that air flow is generally in the direction of arrow 40. Hose section 15, being larger in diameter than section 24, fits outwardly around section 24, to accommodate engagement with bead 30 in the manner described. The result is that an end 41 of tube section 24 is exposed to direct head-on contact with air flow in the direction of arrow 40. This generates an increased turbulence in air flow, as discussed above. That is, the system depicted in FIG. 8 is a critical joint at which air flow is from a wider conduit to a narrower conduit. It will be readily understood that such an arrangement exists, in the conventional system depicted, at critical joints 25, 37, and 39. That is, three critical joints are provided at which there is relatively unstable air flow.

Referring to FIG. 7, it will be understood that as the filter 3 and engine manifold 4 are moved or vibrated independently of one another, lateral stress against the longitudinal axis 40 of each critical joint, for example, critical joint 25, may occur. A component of such stress is indicated by double headed arrows 48 and 49. It will be readily understood that the clamp 31, and indeed the overall engagement between sections 15 and 24, is not appropriately designed to accommodate such stress, i.e., to allow some "give". This will be understood from the further descriptions to contrast considerably with the arrangement of the present invention. Rather than resulting in harmless "give", a misalignment of a system such as those of FIGS. 7 and 8 may result in a bending, crimping or pinching of a component, or a break in a seal. This can lead to premature failure.

It will also be understood by reference to FIG. 8 that a clamping engagement is provided over a relatively narrow section of flexible hose 15, i.e., that section directly beneath clamp 31. Thus, the arrangement is not extremely strong with respect to leakage between sections 15 and 24. This necessitates a particularly tight clamping of clamp 31, which may harmfully stress the system.

It is noted that some of the hose sections are relatively flexible. However, it has generally been observed that they are not sufficiently flexible in the appropriate directions to accommodate stresses of concern as described herein. Should sufficient stresses occur in the manners discussed, the flexible hoses may have a tendency to fail, for example collapse.

It will be observed that a single component system could be created from a single piece of elongate flexible tubing. Generally, such an elongate flexible tube would be undesirable. First, to be sufficiently flexible to accommodate a variety of systems, it would possibly be too weak, and subject to failure. Also, it would still not be adjustable in length.

What has been needed is an arrangement which generally avoids the previous concerns and which is relatively easy to assemble and put into place. Also, what has been needed has been a relatively universal joint or conduit system readily adaptable for use with a variety of systems, wherein a plurality of orientations of the air filter relative to the intake manifold are presented.

OBJECTS OF THE INVENTION

Therefore, the objects of the present invention include: the provision of a conduit system for passage of air from an air filter arrangement to an intake manifold of an engine, which system includes an advantageous number of critical joints by comparison to many conventional systems; to provide such a system which is relatively universal, that is, which is adaptable to a variety of positionings of the air filter arrangement relative to the intake manifold; to provide such an arrangement wherein conduit sections, mounted in series, are utilized to achieve the desired effect; to provide a preferred such arrangement having three conduit sections wherein each of two critical joints between adjoining conduit sections is longitudinally adjustable; i.e. is telescoping; to provide a preferred arrangement wherein lateral stress applied to critical joints between adjacent conduit sections is relatively readily accommodated, by means of a conduit section positioning adjustment mechanism, without substantial risk of critical joint failure; to provide a preferred such arrangement wherein only one critical joint involves air flow from a larger diameter conduit section into a smaller diameter aperture; to provide a preferred such arrangement formed from three relatively lightweight plastic conduit sections; to provide such an arrangement which is relatively easy to manufacture and assemble, relatively simple to use, relatively inexpensive to construct, and which is particularly well adapted for the proposed usages thereof.

Other objects and advantages will become apparent from the following descriptions, taken in connection with the accompanying drawings, wherein are set forth by way of illustration and example certain embodiments of the present invention.

SUMMARY OF THE INVENTION

The present invention concerns a conduit system providing for air flow communication between an air filter arrangement or the like and an intake manifold in an engine assembly. Generally, the arrangement is utilizable in almost any internal combustion engine arrangement, including mobile vehicles such as trucks, construction equipment and agricultural equipment. Also, the system may be used in stationary engine arrangements such as power generators and compressors.

According to the invention, an adjustable system utilizable for a variety of arrangements, is provided by means of relatively rigid, interconnected, conduit elements.

In general, the system involves a first conduit member, a central conduit arrangement, and an end conduit member, attached in series to extend between the filter and the air intake manifold. The central conduit arrangement may comprise a single, unitary, member or a plurality of members attached in series.

In the embodiment shown, the arrangement includes only three conduit elements. That is, the central conduit arrangement comprises a single member. A reason for the near universal nature is that a three-component system involves four critical joints: a first critical joint between a first conduit member and an air filter arrangement to which the first conduit member is attached; a second critical joint between the first conduit member and the second conduit member; a third critical joint between the second conduit member and the third conduit member; and a fourth critical joint between the third conduit member and the air intake manifold. For the preferred embodiment, advantages are derived from the fact that fewer critical joints are involved than for many conventional arrangements, hence the system is less likely to fail.

The critical joints between conduit members, are each preferably longitudinally adjustable; i.e. they telescope. That is, sections of the entire conduit system can be readily adjusted in length, to facilitate mounting and assembly.

Further, each critical joint is rotationally adjustable. As a result of both rotational and longitudinal adjustability, an overall nearly universal arrangement is provided.

Critical joints between conduit sections are of a preferred, advantageous construction. Each critical joint involves insertion of a narrow section into a broader section. The narrow section generally includes an outer surface having a plurality of ribs thereon. For the preferred embodiment, the ribs are aligned generally perpendicular to a longitudinal axis of the conduit section involved. Preferably, each rib is sharply angled and includes a central projecting ridge. The ribs extend over a substantial length of the narrow section, and account for much of the longitudinal adjustability.

Each broader conduit section includes an inner surface with a relatively soft seal therein. During engagement with the narrow section, a plurality of the ribs on the narrow section, typically 3-6, are brought into contact with the soft section within the broader section. An exterior clamp provides for secure engagement.

An advantage to the engagement between a multi-ribbed section and a soft seal section is that a multi-point seal is formed, which is generally more secure than the single point seal of conventional systems. Further, perfect co-axial alignment is not required for a secure connection. In addition, as will be understood from the detailed description, a system is created in which some movement or adjustment with respect to lateral stress is permitted; hence, damaging stress during assembly is less likely and movement during use will be less likely to cause a problem or failure.

A detailed description of specific features leading to the above general features and advantages will be understood from the detailed description and drawings discussed below. Generally, the drawings do constitute a part of the specification and include exemplary embodiments of the present invention, while illustrating various objects and features thereof. It will be understood that in some instances relative component sizes and thicknesses may be shown exaggerated to facilitate an understanding of the invention.

DETAILED DESCRIPTION OF THE INVENTION

As required, detailed embodiments of the present invention are disclosed herein. However, it is to be understood that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed structure.

Figure 7:
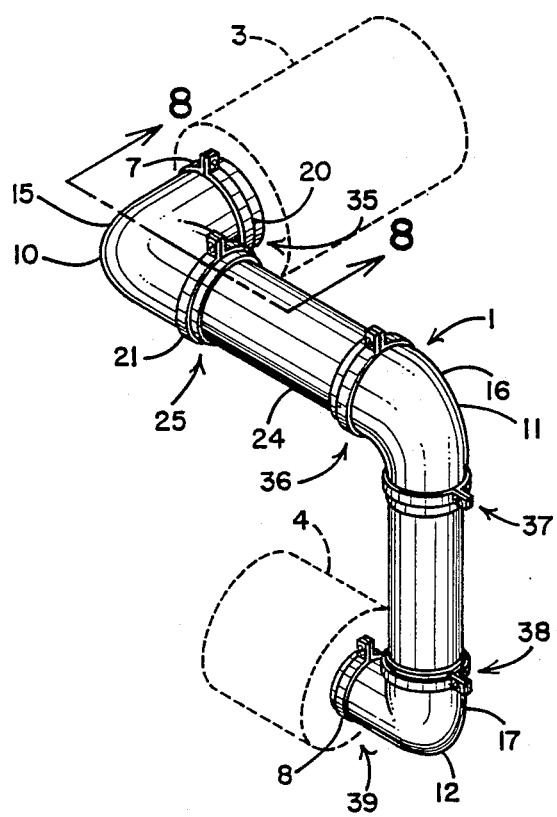
FIG. 7 is a perspective view of a prior art conduit arrangement.
Figure 8:
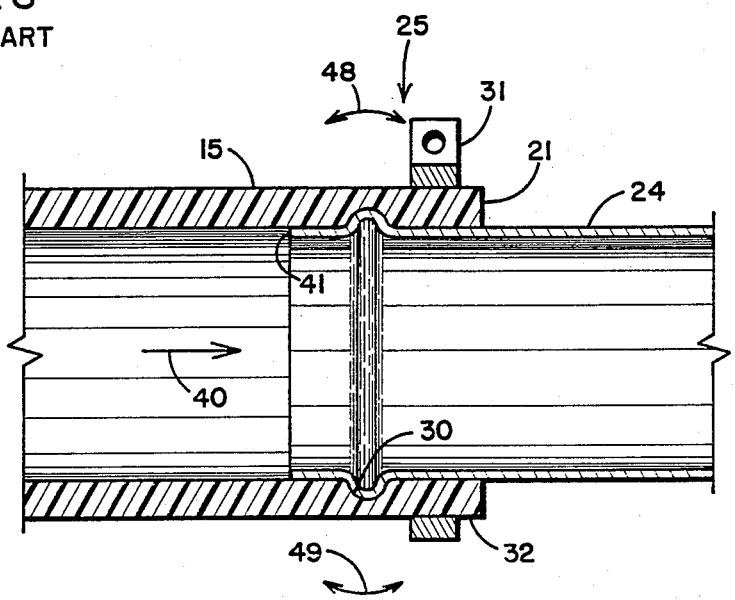
FIG. 8 is an enlarged, fragmentary, cross-sectional view of a prior art arrangement taken generally along line 8—8, FIG. 7.

It is first noted that detailed descriptions of FIGS. 7 and 8, a conventional arrangement, have already been provided.

Figure 1:
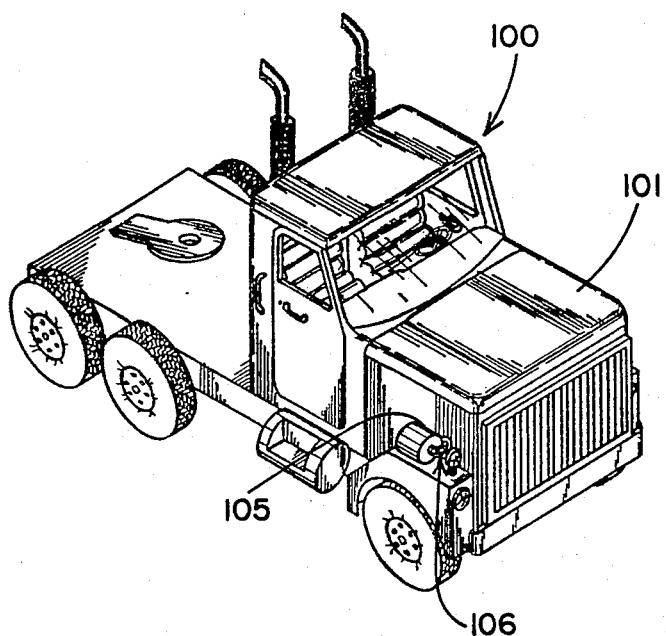
FIG. 1 is a perspective view of a diesel tractor such as may utilize an air conduit system according to the present invention.

Referring to FIG. 1, reference numeral 100 generally represents a typical mechanical embodiment of a system according to the present invention. Specifically, embodiment 100 comprises a semi-tractor 101, such as a diesel tractor. The tractor 101 may be of the conventional type. The tractor 101 includes an engine, not shown, and an air filter assembly 105. Air passing through the air filter 105 is directed into an engine manifold, not shown, by means of conduit system 106. Conduit system 106 is preferably of the improved, advantageous, type according to the present invention, detailed in FIGS. 2-6.

It is to be understood that tractor 101 is representative only of an embodiment for use with the conduit system according to the present invention. Generally, in many arrangements wherein air must pass from an air filter arrangement to an engine manifold, a conduit system according to the present invention may be utilized to advantage. This will be readily apparent, from the following descriptions.

Figure 2:
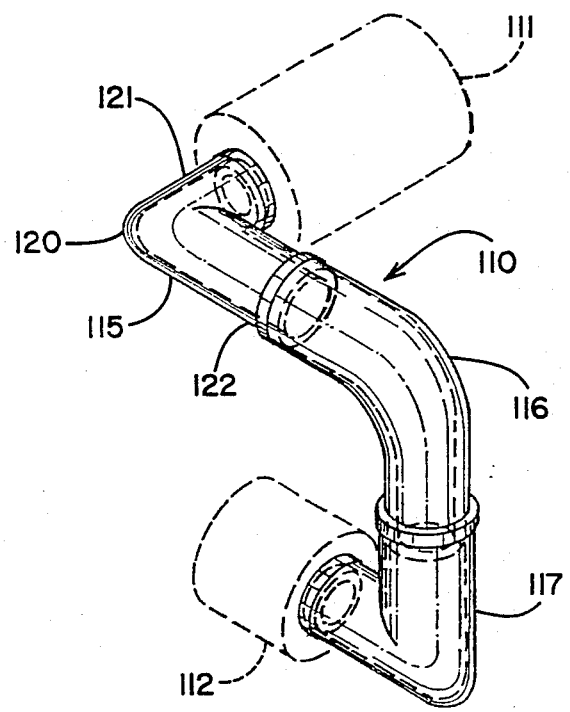
FIG. 2 is a perspective view of an air conduit system according to the present invention.

Referring to FIG. 2, a conduit system 110, according to the invention, is shown in communication between an air filter assembly 111 and an engine intake manifold 112. It is noted that the air filter assembly 111 and intake manifold 112 are not necessarily spatially orientated with respect to one another in the identical manner as would be the air filter assembly 105, of FIG. 1, and the corresponding engine intake manifold, not shown. A purpose in illustrating different physical orientations is to exemplify the near universal nature of conduit systems according to the present invention. The conduit system 110 could easily be rotated, twisted, or otherwise manipulated to operate in the overall embodiment of FIG. 1.

Referring again to FIG. 2, the illustrated conduit system 110 includes three components 115, 116 and 117. For this preferred embodiment, an immediate advantage over the prior art, which utilized five components, is readily apparent. Each of sections 115, 116 and 117 is preferably an air flow conduit having features as described below. Preferably sections 115, 116 and 117 are relatively rigid in construction, for example formed from plastic or the like. Some flexibility will be desired, in order to accommodate stresses. However, generally the forms are relatively rigid and thus differ substantially from many conventional arrangements which utilize at least some very flexible rubber or rubber-like conduit members. Each section 115, 116 and 117 includes a bend therein, facilitating adjustment to extend in almost any direction. It will be understood that many of the advantages of the present invention can be obtained for arrangements having other than three components. However, for many applications the three-component arrangement is preferred.

Each of the three conduit sections 115, 116 and 117 differs substantially from the other two. The first conduit section 115 is specifically designed to interface with a typical air filter mechanism, such as mechanism 111. More specifically, conduit section 115 includes a turn, generally a right angle or 90 degree curve, therein, as indicated at 120. Thus, conduit section 115 includes a first section 121 and a second section 122, separated by bend 120.

Figure 3:
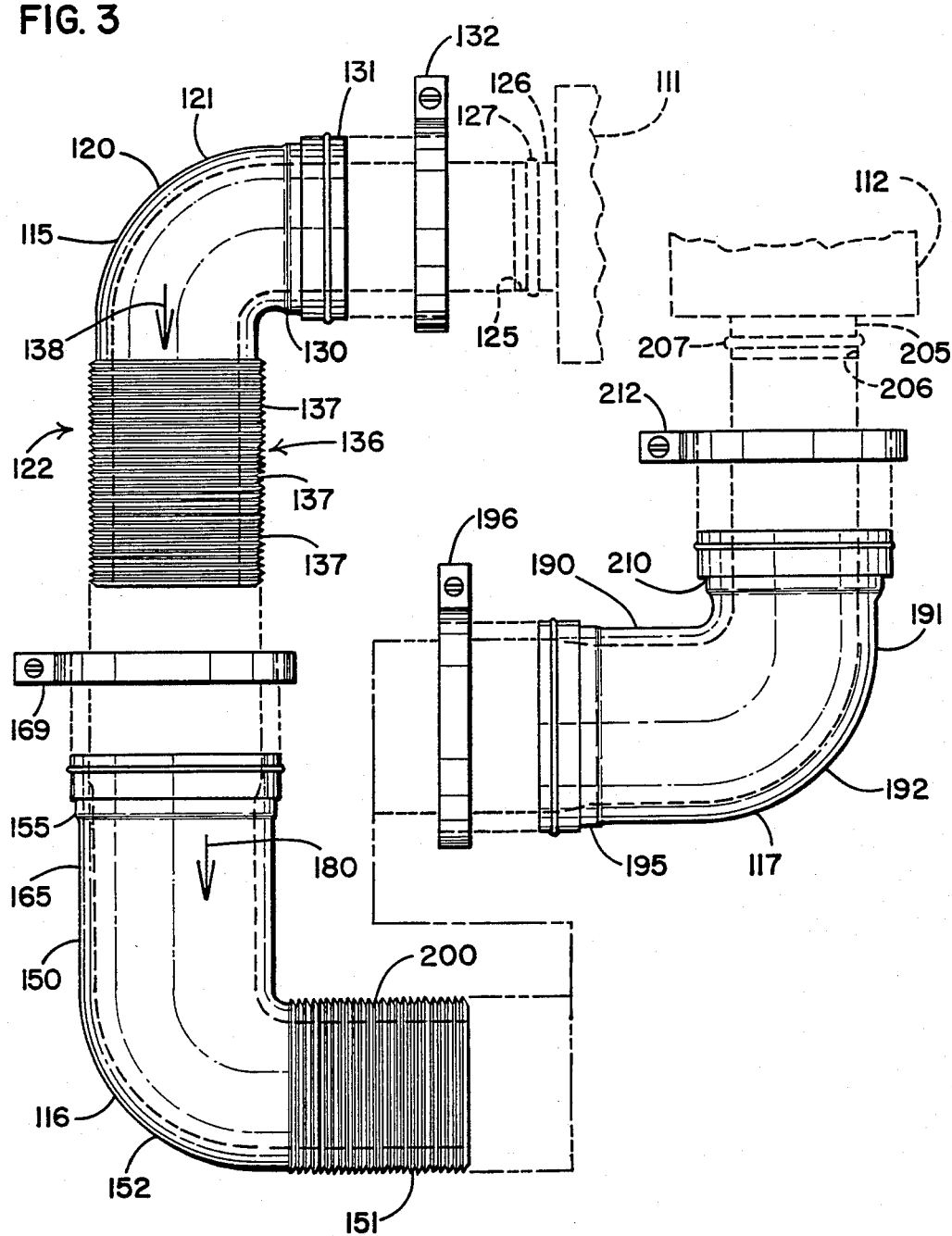
FIG. 3 is an enlarged, fragmentary, partially exploded, plan view of a conduit system according to the present invention.

Referring to FIG. 3, detail concerning section 115 will be understood.

In FIG. 3, a portion of a typical air filter assembly 111 is depicted. Air filter assembly 111 is conventional, that is, it includes an exit port 125 for air, defined by a tubular extension 126. Since extension 126 is conventional, that is, it is designed for attachment to conventional conduit systems, it includes a circular mounting bead 127 thereon.

First extension 115 of a conduit system according to the present invention is specifically adapted for use with a conventional air filter arrangement 111 having a mounting bead 127 thereon. In particular, end section 121 includes a bell portion 130 on the end thereof, flared appropriately to fit over bead 127. If, as shown in FIG. 3, a cushioned liner, collar 131 or the like is positioned to extend along and inside of bell 130, the bell 130 can be readily secured over bead 127 by a conventional clamp 132, in a conventional manner. This is the case even if section 115 is formed from a relatively rigid plastic material, since sufficient compressibility to cause a seal can be readily obtained, especially with collar 131.

Herein, end 121 having bell 130 thereon will be referred to as a "broad" or "broader" end of extension 115. For the preferred embodiment, it flares outwardly to receive a portion of a "narrow" or "narrower" extension 126 therein.

Extension 115 also includes a second end 122, positioned around bend 120 from end 121. End 122 will be referred to herein as the "narrow" or "narrower" end, since it is specifically adapted to be received into a broad end of a next adjacent conduit member, specifically member 116.

For preferred embodiments of the present invention, end 122 includes a ribbed portion 136 thereon, comprising a plurality of individual ribs 137. It will be understood that in preferred embodiments of the present invention, ribs 137 are not threads, but rather each is an individual and independent rib which completely circumscribes section 122 in a manner generally perpendicular to a longitudinal axis 138 of conduit 115. The ribs 137 are preferably positioned in the area of end section 122. Preferably a plurality of ribs extending over about 3-4 inches of end section 122 are used, the ribs being uniformly spaced about ⅛-½ inch and preferably about ¼ inch apart.

Figure 6:
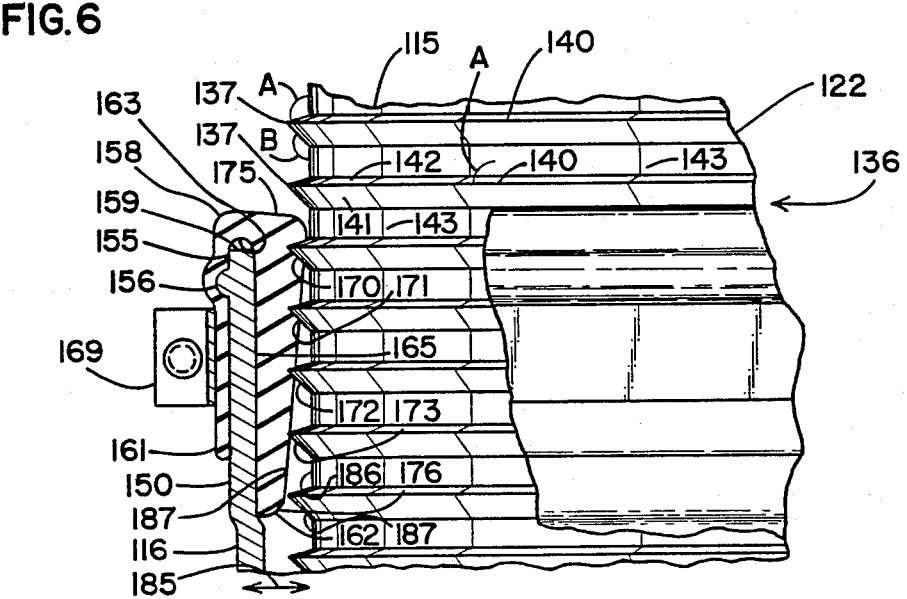
FIG. 6 is an enlarged, fragmentary view of a critical joint in a system according to the present invention, with portions broken away to show internal detail.

A preferred construction for the ribs 137 is indicated in FIG. 6. In particular, in FIG. 6, the joint between conduit sections 115 and 116 is shown, with end section 122 inserted into a portion of section 116. Individual ribs 137 are readily viewable. Each rib 137 has a sharp central outermost ridge 140 and opposite sidewalls 141 and 142. Sidewalls 142 generally face the broad end of section 115, whereas sidewalls 141 generally face an opposite direction. In the preferred embodiment shown, ribs 137 are all substantially identical to one another, preferably uniformly spaced by a portion 143 of section 122. In preferred embodiments, wall 142 extends outwardly at an angle closer to perpendicular, with respect to section 143, than does wall 141. More specifically, referring to FIG. 6, generally angle B (the obtuse angle of side 141 with respect to surface 143 or a longitudinal axis of section 115) is greater than angle A (the obtuse angle of side 142 with respect to surface 143 or a longitudinal axis of section 115). For preferred embodiments, angle A is between about 95 and 115 degrees, preferably is about 105 degrees; and, angle B is between about 120 and 150 degrees, and preferably is about 135 degrees.

The overall height of central ridge 140 above portions 143, for preferred embodiments, is between about 0.07 and 0.11 inches, and preferably is about 0.09 inches. Such a dimension generates a prominent, sharp, ridge which facilitates sealing, as described below.

It is to be understood that the specific shapes and sizes of ribs 137 may be varied considerably, in keeping with the principles of the present invention. However, advantages are obtained from the general shapes described, as will be understood, since good effective seals may be formed therewith.

Referring again to FIGS. 2 and 3, section 116 is mounted in fluid flow communication with end portion 122 of section 115. FIG. 2 shows that for preferred embodiments, section 116 includes a first extension 150 and a second extension 151 separated by bend 152. For the preferred embodiment, bend 152 comprises an approximate right angle, or 90 degree curve, in conduit section 116. However, alternate arrangements may be provided.

Generally, end section 150 comprises a broad end and includes a bell portion 155 thereon, to receive end portion 122 therein. Referring to FIG. 6, the preferred bell portion 155 includes an outer bead 156 thereon. Elastomer collar 158 is fit over an end 159 of bell 155. Bead 156 facilitates maintenance of elastomer portion 158 in position and helps provide an effective fluid seal. For the preferred embodiment, elastomer collar 158 includes an outer flap or flange 161, positioned outside of bell portion 155, and a thicker inner flap or flange 162, oriented to be positioned along an inner side 165 of the bell 155. That is, flanges 161 and 162 are separated by mounting groove 163. Preferably, elastomer collar flap 162 extends over about 1–3 inches of bell 155.

In FIGS. 3 and 6, hose clamp 169 is shown oriented to secure engagement between sections 115 and 116. Referring to FIG. 6, it will be understood that as clamp 169 is tightened, bell 155 is compressed, pressing elastomer collar 158 into ridges 137. Thus, sealing engagement between members 115 and 116 is provided.

The specific sealing engagement disclosed is advantageous for numerous reasons. First, it is longitudinally adjustable, i.e. it can telescope. That is, since a plurality of ribs 137 are provided, and only relatively few, preferably 3–6, are needed to effect the necessary seal, parts 115 and 116 can be slid longitudinally with respect to one another, and an effective seal can still be obtained. Specifically, a deeper, or less deep, insertion of section 115 into section 116 can be utilized to adjust the conduit system 110 for a variety of relative spatial relationships between the air filter assembly 111 and the intake manifold 112. Further, the engagement is rotationally adjustable, prior to secure clamping of clamp 169. This further facilitates universal use of conduit system 110.

Another advantage is that a plurality of seal points are generated. Referring to FIG. 6, it will be understood that point seals are provided between the elastomer collar 158 and the ribs 137 along points or ridges 170, 171, 172, and 173.

It is noted that for the preferred embodiment illustrated in FIG. 6, the depth of seal, or amount of engagement, increases for each rib along the progression from point 173 to 172, 171 and 170. This results from two characteristics, first the outward bell shape of section 116 along area 150; and, also, from an inward tapering shape, or narrowing in thickness, of section 162 from a thicker end 175 to a thinner end 176. This results in a considerable advantage, as explained below.

Referring to FIG. 3, end 150 of section 116 includes a central longitudinal axis 180. Generally, when sections 115 and 116 are joined, axes 138 and 180 are aligned substantially co-axially. However, in some instances, perfect coaxial alignment cannot be readily achieved, due to the general overall spatial alignment between the air filter mechanism 111 and the engine air intake manifold 112.

In conventional systems, such a "misalignment" could cause a substantial problem. A reason for this was that conventional clamping of a seal generally required engaging surfaces which were substantially co-planar, otherwise a weak seal might be formed, or undesired stress could be caused along various elements. In the present system, however, each seal 170, 171, 172 and 173 occurs along a relatively sharply defined point, so angular movement between pieces 115 and 116, for example in the general directions indicated by double headed arrow 185, FIG. 6, can be accommodated.

Another advantage is readily apparent from this. Specifically, space, such as space 186, between the narrow member 122 and the broad member 150, permits lateral movement under stress, without substantial harm to the seals. Thus, should the engine position move somewhat relative to the air filter, or vice versa, critical joints such as the joint between sections 115 and 116 can adjust to accommodate the movement. Specifically, should section 115 pivot to partially collapse space 186, point seal 170 may become weaker, however, seal 173 will have become deeper, compensating somewhat. Also, a new seal may begin to form at point 187. This flexibility is in part accommodated by the tapering elastomer section 102 discussed above. That is, it provides an overall dampening effect.

Another advantage results from the fact that seals 170, 171, 172 and 173 are independent of one another. Thus, leakage is less likely. Specifically, it is unlikely that a failure resulting in a continuous trough extending completely across the sealing region of engagement between sections 115 and 116 would occur.

Referring again to FIG. 3, a third section of conduit 117 includes a first end portion 190 and a second end portion 191. Generally, for preferred embodiments, end portions 190 and 191 are separated by a bend 192. For preferred embodiments, bend 192 is approximately a 90 degree, or right angle curve, in section 117.

For preferred embodiments, end portion 190 is substantially similar to end portion 150 of section 116. That is, end portion 180 is a broad end. Specifically, end portion 190 includes a bell shaped portion 195 and an elastomer collar arrangement (not shown) generally analogous to elastomer collar 158 of FIG. 6. By means of clamp 117, section 192 can be connected to end portion 151, a narrow end of section 116 having ribs 200 thereon, in a manner generally analogous to engagement between sections 115 and 116, previously detailed. Thus, for preferred embodiments, all of the advantages previously described with respect to the seal arrangement detailed in FIG. 6 would apply to the critical joint between sections 117 and 116.

As previously indicated, generally system 110 is developed as an advantageous conduit system between conventional air filter arrangements 111 and air intake manifolds 112. Referring to FIG. 3, since the intake manifold is generally conventional, it includes an extension 205 thereon having a central aperture 206 with an outer circumferential bead 207. Thus, engagement with the conduit system is preferably by means of an engagement mechanism generally analogous to that utilized between section 115 and the air filter exit port 125. In particular, end 191 of section 117 is provided with a bell 210 thereon, which can fit over bead 207 and be secured thereto by means of clamp 212. If desired, a rubber collar, insert liner, or the like can be utilized to facilitate a good connective seal. Since section 117 provides for communication with the air intake manifold, it is sometimes referred to herein as the end conduit member.

It will be understood that for certain improved, non-conventional systems, section 126 of the air filter mechanism 111 could be provided with ribs generally analogous to ribs 137, for a more secure arrangement. Further, it will be understood that end portion 191 of the third section 117 could be formed without the bell 210 and with ribs such as ribs 137 on an outer portion thereof, to be received within an appropriate member connected at or to intake manifold 112.

However, for conventional systems it is generally foreseen that the three sections 115, 116 and 117 will be as above described. That is: component 115 will include a broad end and narrow end, separated by a bend as described; component 116 will include a broad end and narrow end separated by a bend, as described, and, component 117 will include two broad ends, as described.

Figure 4:
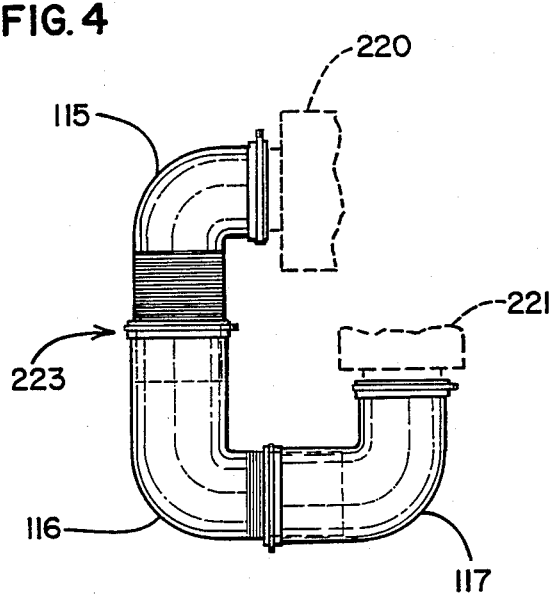
FIG. 4 is a fragmentary top plan view of an alternate alignment of the arrangement depicted in FIG. 2.
Figure 5:
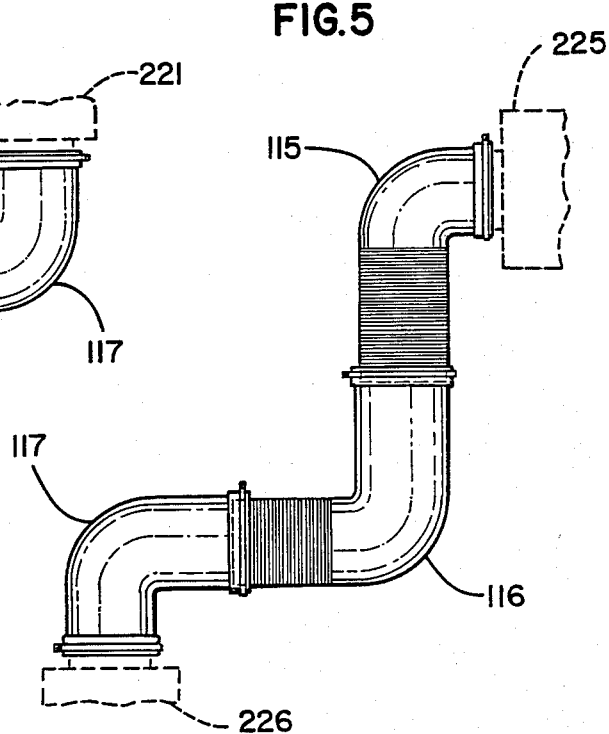
FIG. 5 is a fragmentary, plan view showing an alternate alignment of the arrangement to those shown in FIGS. 2 and 4.

It will be understood from evaluation of FIG. 3 that the entire preferred system shown includes four critical joints, two of which involve a ribbed member and bell member engagement, as described. Any two connecting pieces can be rotated with respect to one another, and the two "internal" critical joints (those between conduit members or sections) involving ribbed members can also be longitudinally adjusted (i.e., telescoped) with respect to one another. As a result, the three components can be utilized to form an overall conduit system between an air filter arrangement and a corresponding air intake manifold in a variety of systems. Examples of this are shown in FIGS. 4 and 5. In FIG. 4, the air filter mechanism is represented at reference numeral 220, whereas the intake manifold is represented at 221. Sections 115, 116 and 117 are shown communicating therebetween, even though members 220 and 221 are oriented differently than analogous members 111 and 112 in FIG. 2. Specifically, section 116 is illustrated rotated counter-clockwise at joint 223, relative to its position in FIG. 2.

Similarly, in FIG. 5, members 115, 116 and 117 are shown communicating between filter mechanism 225 and intake manifold 226. Mechanism 225 and manifold 226 are readily seen to be spatially oriented completely differently from analogous components 111 and 112 in FIG. 4.

It will be also understood that for the preferred three-component system shown ease of assembly is facilitated relative to the five-component prior art arrangement, since a fewer number of parts are needed, i.e., three conduit sections and a plurality of clamps. Thus, at least the preferred embodiment of the present system is a substantial improvement over the prior art illustrated in FIG. 7, with respect to assembly. Also, even if an arrangement according to the present invention included more than three components, it would still be relatively easy to assemble due to the ability of the joints to adjust in response to lateral stress, and also to telescope.

Systems according to the present invention may be generally characterized as involving: a first conduit member; a central conduit arrangement; and, an end conduit member. The central conduit member may, preferably, comprise a single, unitary, conduit member. However, in some applications it may comprise a plurality of members in series. The conduit members, and central conduit arrangement, preferably include end portions as described, for preferred locking engagement.

Further, especially since relatively rigid, molded, components can be utilized for sections 115, 116 and 117, a lightweight system can be developed. Generally, it is preferred to use lightweight components, as they are easier for a mechanic to support and manipulate, and also they lead to overall weight efficiency for any moving vehicle on which they are mounted.

It is to be understood that while certain embodiments of the present invention have been illustrated and described, it is not to be limited to the specific forms or arrangements of parts herein described and shown.

What is claimed and desired to be secured by letters patents is as follows:

1. A conduit system for providing air flow communication between an air filter assembly and an air intake manifold, said conduit system comprising:
   (a) a substantially rigid first conduit member having: inner and outer surfaces; first and second opposite ends, and first and second opposite end portions;
      (i) said first conduit member first end portion being constructed and arranged for air flow communication with an exit port on the air filter assembly;
      (ii) said first conduit member second end portion comprising a narrow end portion with a plurality of spaced annular ribs thereon, each of said ribs having a sharply defined central ridge;
   (b) a central conduit arrangement having: inner and outer surfaces; first and second opposite ends; and, first and second opposite end portions;
      (i) said central conduit arrangement first end portion being a broad end portion constructed and arranged for receipt of said first conduit member second end portion therein, through said central conduit arrangement first end;
      (ii) said central conduit arrangement second end portion comprising a narrow end portion with a plurality of spaced annular ribs thereon, each of said ribs having a sharply defined central ridge;
   (c) a substantially rigid end conduit member having: inner and outer surfaces; first and second opposite conduit ends; and, first and second opposite end portions;
      (i) said end conduit member first end portion being a broad end portion constructed and arranged for receipt of said central conduit arrangement second end portion therein, through said end conduit member first end;
      (ii) said end conduit member second end portion being constructed and arranged for air flow communication with an inlet port on the air intake manifold;
   (d) a first elastomeric seal member positionable between annular ribs on said first conduit member second end portion, and said central conduit-arrangement first end portion; and,
   (e) a second elastomeric seal member positionable between annular ribs on said central conduit arrangement second end portion and said end conduit member first end portion.

2. A system according to claim 1 wherein:

(a) said first conduit member includes a first bend between said first and second end portions; and, (b) said end conduit member includes a second bend between said first and second end portions.

3. A system according to claim 2 wherein:

(a) said central conduit arrangement includes at least one bend between said first and second end portions.

4. A system according to claim 3 wherein:

(a) said central conduit arrangement comprises a second, unitary, conduit member; including a third bend therein.

5. A system according to claim 4 wherein each of said first, second and third bends is a right angle bend.

6. A conduit system for providing air flow communication between an air filter assembly and an air intake manifold; said conduit system comprising:

(a) a substantially rigid first conduit member having: inner and outer surfaces; first and second opposite ends; and, first and second opposite end portions separated by a first bend,
 (i) said first conduit member first end portion being constructed and arranged for air flow communication with an exit port on the air filter assembly;
 (ii) said first conduit member second end portion comprising a narrow end portion with a plurality of spaced annular ribs thereon, each of said ribs having a sharply defined central ridge;
 (iii) said first conduit member second end portion having a first, central, longitudinal axis and each of said ribs on said first conduit member second end portion extending in a plane substantially perpendicular to said first longitudinal axis;
 (iv) said ribs on said first conduit member each having a forward side and a rearward side defining one of said central ridges therebetween: said first conduit member rib forward sides generally each facing toward said first conduit member first end portion and each projecting outwardly from said first conduit member outer surface at a first obtuse angle with respect to said first longitudinal axis, and said first conduit member rearward sides each facing generally oppositely from said forward facing sides and projecting outwardly from said first conduit member outer surface at a second obtuse angle with respect to said first longitudinal axis;

(b) a substantially rigid second conduit member having: inner and outer surfaces; first and second opposite ends; and, first and second opposite end portions separated by a second bend;
 (i) said second conduit member first end portion being a broad end portion constructed and arranged for receipt of said first conduit member second end portion therein, through said second conduit member first end;
 (ii) said second conduit member second end portion comprising a narrow end portion with a plurality of spaced annular ribs thereon, each of said ribs having a sharply defined central ridge;
 (iii) said second conduit member second end portion having a second, central, longitudinal axis and each of said ribs on said second conduit member second end portion extending in a plane substantially perpendicular to said second longitudinal axis;
 (iv) said ribs on said second conduit member each having a forward side and a rearward side defining one of said central ridges therebetween; said second conduit member rib forward sides generally each facing toward said second conduit member first end portion and each projecting outwardly from said second conduit member outer surface at a third obtuse angle with respect to said second longitudinal axis; said second conduit member rearward sides each facing generally oppositely from said forward facing sides and projecting outwardly from said second conduit member outer surface at a fourth obtuse angle with respect to said second longitudinal axis;

(c) a substantially rigid third conduit member having: inner and outer surfaces; first and second opposite conduit ends; and, first and second opposite end portions separated by a third bend;
 (i) said third conduit member first end portion being a broad end portion constructed and arranged for receipt of said second conduit member second end portion therein, through said third conduit member first end;
 (ii) said third conduit member second end portion being constructed and arranged for air flow communication with an inlet port on the air intake manifold;

(d) a first elastomeric seal member positionable between annular ribs, on said first conduit member second end portion, and said second conduit member first end portion; and, (e) a second elastomeric seal member positionable between annular ribs, on said second conduit member second end portion, and said third conduit member first end portion;

(f) whereby sealing engagement between adjacent conduit members is obtainable along engagement between selected ones of said ribs and an associated seal member by means of compression clamps positionable around portions to be sealed.

7. The conduit system according to claim 6 wherein each of said first, second and third bends is about a right angle bend.

8. The conduit system according to claim 6 including:

(a) a first elastomeric collar member having an exterior flange and an interior flange separated by a mounting groove; said elastomeric collar member being constructed and arranged for mounting on said second conduit member first end portion: with said interior flange member projecting inwardly of said second conduit member first end and along said second conduit member inner surface; and, with said exterior flange member extending along said second conduit member outer surface; and (b) a second elastomeric collar member having an exterior flange and an interior flange separated by a mounting groove; said elastomeric collar member being constructed and arranged for mounting on said third conduit member first end portion: with said interior flange member projecting inwardly of said third conduit member first end and along said third conduit member inner surface; and, with said exterior flange member extending along said third conduit member outer surface.

9. The conduit system according to claim 8 wherein:

(a) said second conduit member first end portion has an exterior annular bead thereon; said exterior bead being operationally positioned beneath said first elastomeric collar exterior flange; and, (b) said third conduit member first end portion has an exterior annular bead thereon; said exterior bead being operationally positioned beneath said second elastomeric collar member exterior flange.

10. The conduit system according to claim 8 wherein:
(a) said first elastomeric collar member interior flange tapers downwardly in thickness as it extends inwardly of said second conduit member; and,
(b) said second elastomeric collar member interior flange tapers downwardly in thickness as it extends inwardly of said third conduit member.

11. The conduit system according to claim 6 wherein:
(a) said second obtuse angle is greater than said first obtuse angle; and
(b) said fourth obtuse angle is greater than said third obtuse angle.

12. The conduit system according to claim 11 wherein:
(a) said first obtuse angle is between 95° and 115°;
(b) said second obtuse angle is between about 120° and about 130°;
(c) said third obtuse angle is between about 95° and about 115°; and,
(d) said fourth obtuse angle is between about 120° and about 130°.

13. The conduit system according to claim 6 wherein:
(a) each of said ribs on said first conduit member is spaced between ⅛ inch and ½ inch from a next adjacent rib; and
(b) each of said ribs on said second conduit member is spaced between ⅛ and ½ inch from a next adjacent rib.

14. The conduit system according to claim 13 wherein:
(a) each rib on said first conduit member projects outwardly between 0.07 and 0.11 inches from said first conduit member; and,
(b) each rib on said second conduit member projects outwardly between 0.07 and 0.11 inches from said second conduit member.

15. A conduit system for providing air flow communication between an air filter assembly and an air intake manifold; said conduit system comprising:
(a) a substantially rigid first conduit member having: inner and outer surfaces; first and second opposite ends; and, first and second opposite end portions separated by a first bend;
(i) said first conduit member first end portion being constructed and arranged for air flow communication with an exit port on the air filter assembly;
(ii) said first conduit member second end portion comprising a narrow end portion with a plurality of spaced annular ribs thereon, each of said ribs having a sharply defined central ridge;
(iii) said first conduit member second end portion having a first, central, longitudinal axis; and, each of said ribs on said first conduit member second end portion extending in a plane substantially perpendicular to said first longitudinal axis;
(iv) said ribs on said first conduit member each having a forward side and a rearward side defining one of said central ridges therebetween: said first conduit member rib forward sides generally each facing toward said first conduit member first end portion and each projecting outwardly from said first conduit member outer surface at a first obtuse angle with respect to said first longitudinal axis; and, said first conduit member rearward sides each facing generally oppositely from said forward facing sides and projecting outwardly from said first conduit member outer surface at a second obtuse angle with respect to said first longitudinal axis;
(b) a substantially rigid second conduit member having: an inner and outer surface, first and second opposite ends; and, first and second opposite end portions separated by a second bend;
(i) said second conduit member first end portion being a broad end portion constructed and arranged for receipt of said first conduit member second end portion therein, through said second conduit member first end;
(ii) said second conduit member second end portion comprising a narrow end portion with a plurality of spaced annular ribs thereon, each of said rib having a sharply defined central ridge;
(iii) said second conduit member second end portion having a second, central, longitudinal axis;
(iv) said ribs on said second conduit member each having a forward side and a rearward side defining one of said central ridges therebetween; said second conduit member rib forward sides generally each facing toward said second conduit member first end portion and each projecting outwardly from said second conduit member outer surface at a third obtuse angle with respect to said second longitudinal axis; said second conduit member rearward sides each facing generally oppositely from said forward facing sides and projecting outwardly from said second conduit member outer surface at a fourth obtuse angle with respect to said second longitudinal axis;
(c) a substantially rigid third member having: inner and outer surfaces; first and second opposite conduit ends; and, first and second opposite end portions separated by a third bend;
(i) said third conduit member first end portion being a broad end portion constructed and arranged for receipt of said second conduit member second end portion therein, through said third conduit member first end; and,
(ii) said second conduit member second end portion comprising a narrow end portion with a plurality of spaced annular ribs thereon, each of said ribs having a sharply defined central ridge.

16. The conduit system according to claim 15 wherein:
(a) said second obtuse angle is greater than said first obtuse angle; and,
(b) said fourth obtuse angle is greater than said third obtus angle.

17. The conduit system according to claim 16 wherein:
(a) said first obtuse angle is between 95° and 115°;
(b) said second obtuse angle is between about 120° and about 130°;
(c) said third obtuse angle is between about 95° and about 115°; and,
(d) said fourth obtuse angle is between about 120° and about 130°.

18. The conduit system according to claim 15 wherein:
(a) each of said ribs on said first conduit member is spaced between 0.125 inch and 0.5 from a next adjacent rib; and, (b) each of said ribs on said second conduit member is spaced between 0.125 and 0.5 inch from a next adjacent rib.

19. The conduit according to claim 18 wherein:
(a) each rib on said first conduit member projects outwardly between 0.07 and 0.11 inches from said first conduit member; and,
(b) each rib on said second conduit member projects outwardly between 0.07 and 0.11 inches from said second conduit member.

20. A system according to claim 15 including:
(a) a first elastomeric seal member positionable between annular ribs on said first conduit member second end portion, and said second conduit member first end portion; and,
(b) a second elastomeric seal member positionable between annular ribs, on said second conduit member second end portion, and said third conduit member first end portion;
(c) whereby sealing engagement between adjacent conduit members is obtainable along engagement between selected ones of said ribs and an associated seal member by means of compression clamps positionable around portions to be sealed.

* * * * *